United States Patent [19]

Verdier et al.

[11] 3,993,734

[45] Nov. 23, 1976

[54] PROCESS FOR THE MANUFACTURE OF ALKALI METAL POLYPHOSPHATES

[75] Inventors: Jean-Michel Verdier, Paris; Jacques Becuwe, Fontenay-sur-Bois; Jacques Chastel, Rouen, all of France

[73] Assignee: Rhone-Progil, Courbevoie, France

[22] Filed: June 30, 1975

[21] Appl. No.: 591,889

Related U.S. Application Data

[63] Continuation of Ser. No. 383,616, July 30, 1973, abandoned.

[52] U.S. Cl. ................................. 423/315; 423/305
[51] Int. Cl.² ..................... C01B 15/16; C01B 25/26
[58] Field of Search .......................... 423/315, 305

[56] References Cited
UNITED STATES PATENTS

| | | | |
|---|---|---|---|
| 3,210,154 | 10/1965 | Klein et al. | 423/315 |
| 3,309,174 | 5/1967 | Pals | 423/315 |
| 3,382,036 | 5/1968 | Post et al. | 423/315 |

FOREIGN PATENTS OR APPLICATIONS

| | | | |
|---|---|---|---|
| 1,026,675 | 4/1966 | United Kingdom | 423/315 |

*Primary Examiner*—Oscar R. Vertiz
*Assistant Examiner*—Gregory A. Heller

[57] ABSTRACT

A process for the manufacture of alkali metal polyphosphates having a predetermined crystalline form, in which a mixture of alkali metal orthophosphates having a molar ratio of alkali metal oxide to phosphoric anhydride between 1 and 2 is first granulated, the resulting granules are dried and then are subjected to thermal treatment in the presence of aqueous vapor.

12 Claims, No Drawings

PROCESS FOR THE MANUFACTURE OF ALKALI METAL POLYPHOSPHATES

This is a continuation of application Ser. No. 383,616, filed July 30, 1973, now abandoned.

This invention relates to the manufacture of alkali metal polyphosphates, and more particularly to the manufacture of sodium tripolyphosphate having determined grades, especially hydration grades which can be pre-determined.

Sodium tripolyphosphate is widely used in the formulation of lyes and detergents and frequently constitutes from 10 to 50% of such lyes and detergents.

Generally, the sodium tripolyphosphate is manufactured by the following processes: at first there is prepared a mixture of mono- and disodium orthophosphates corresponding to the formula $$1\ NaH_2PO_4 + 2\ Na_2HPO_4$$

In this mixture, the total ratio Na/P is close to 5/3. Most frequently, the salts are obtained from aqueous solutions which are dried, generally by atomization. They are more or less dry and they are subjected to calcination either after atomization or along with atomization.

Through the calcination, the orthophosphates undergo an intermolecular dehydration, schematized by the equation:

$$1\ NaH_2PO_4 + 2\ Na_2HPO_4 \rightarrow Na_5P_3O_{10} + 2\ H_2O$$

which leads to the formation of tripolyphosphate. It is known that the presence of aqueous vapor brought into contact with the orthophosphates promotes the yield of the reaction. The temperature at which the calcination is conducted has an influence on the reaction rate, which is faster at a high temperature; however, too high a temperature leads to the formation of generally undesirable insoluble high polymers.

It is also known that the selection of the temperature determines the crystalline form of the tripolyphosphate which is obtained; the form of phase I called too "high temperature phase" happens generally when the calcination is achieved above 500° C. The form of phase II called too "low temperature phase" occurs when the calcination is achieved below 500° C.

It is also known that pulverulent tripolyphosphates have a behaviour with respect to hydration which differs according to the crystalline form, although both forms lead to the same hydrate $Na_5P_3O_{10} \cdot 6\ H_2O$. Form I hydrates very fast by forming hard agglomerates; form II hydrates much more slowly and practically does not form blocks.

In the use of such tripolyphosphates it is generally desirable to employ a product which is readily hydratable; however, it is frequently necessary to employ a product in the form II which hydrates well without setting even though the rate of hydration is slow.

Processes in use for the production of tripolyphosphates are generally capable of producing a product in which only a predetermined portion of the product has the desired form. It is difficult to control, in known processes, the calcination at a temperature to produce the desired product. The resultant irregularities are generally regarded as being attributable to the calcination. As a practical matter, the pulverulent orthophosphates are hygroscopic; under the influence of temperature the mixture becomes sticky which necessitates the use of mechanical means to combat setting. Nevertheless, the tendency of the material to set makes the thermal treatment difficult.

It is also known that certain mineral salts present at the time of calcination may change the crystalline structure obtained for a given temperature. These foreign salts, although frequently added in non-negligible amounts, allow only a minimum correction in the results of a calcination operation.

Moreover, the calcination is achieved in the presence of aqueous vapor which, according to the prior art, is supplied in the form of water, of vapor or by incompletely drying of the raw materials. In this last case, the degree of humidity is not always homogeneous and the result is that there are irregularities in the product.

Moreover, it is frequently necessary to recirculate significant amounts of incompletely converted products, particularly in rotary calcining furnaces, so that the duration of the processes is always very long.

Lastly, in most cases there is obtained only a coarse product having an irregular granulation which still must be conditioned.

There has been found a process permitting to produce alkaline polyphosphates having previously a determined crystalline form, by thermal treatment in the presence of water vapor of a mixture of substantially dry orthophosphates, having a molar ratio of alkaline oxide to phosphoric anhydride of between 1 and 2. These orthophosphates can be prepared by any known process, preferably from phosphoric acid in the wet process.

According to this invention, in a first stage, there is achieved a granulation of the mixture of orthophosphates by means of water or of an aqueous solution; the spherical granules of orthophosphate obtained are dried and, in a second stage, the dried spherical granules of orthophosphate are subjected to the thermal treatment.

The process is preferably applied to the preparation of sodium tripolyphosphate from a mixture of mono and disodium orthophosphates having a molar ratio of $Na_2O\ /\ P_2O_5$ close to 5/3.

The aqueous solution is advantageously the aqueous solution of the mixture of mono- and disodium orthophosphates having a molar ratio of $Na_2O\ /\ P_2O_5$ close to 5/3.

For the granulation may be used any apparatus suitable for granulation, preferably equipped with a device permitting selection of the granulometry. Most frequently, there are selected granules having a diameter comprised between 0.1 and 3.15 mm. The granules retained on the sieve are returned to the granulation operation.

After the granulation, the granules are dried below a temperature of 120° C by any known means of drying. Generally, there is applied a temperature of the order of 100° C.

In one method of processing in the second stage of the operation, the dried granules are subjected to a thermal treatment in a fluid bed.

In another method of processing in the second stage of the operation, the dried granules are subjected to a thermal treatment by introducing them into a fluid bed by means of pneumatic conveying at high temperatures.

Water vapor is introduced into the fluidization gases. After the second stage, the orthophosphates are converted to tripolyphosphates in a practically complete conversion. The granules obtained have the shape and the size of the granules of orthophosphates of the first stage.

The average residence time of the granules in the second stage is generally below 30 minutes.

In the first method of processing, the average residence time of the granules in the fluid bed is generally between 5 and 30 minutes depending on the size of the granules. When the temperature of the fluid bed is maintained at about 300° to 400° C, all of the tripolyphosphate granules obtained are those of phase II. Maintaining a temperature of about at least 480° C will result in tripolyphosphate granules of phase I. The maintenance of an intermediate temperature allows the production of a mixture of both phases in a predetermined proportion.

In the second method of processing, the dried granules are introduced into pneumatic conveying means at high temperatures; the residence time of the granules is a few seconds, generally from 1 to 5 seconds. In the fluid bed, which follows, the residence time of the granules is less than in the first method of processing; generally, it ranges from 1 to 10 minutes. The ranges of temperature in which there are obtained the phase I and phase II products are less than those in the first method of processing of the thermal treatment.

The process of this invention is preferably applied continuously in the following manner: The mixture of pulverulent, substantially dry sodium orthophosphates having a ratio of $Na_2O / P_2O_5 = 5/3$, is introduced into a granulating apparatus in the wet state, such as a granulator, pelleting machine, granulation plate, fluid bed or another known apparatus, permitting adjustment of the size grading. At the same time, there is introduced water or an aqueous solution, preferably at 50% by weight solution of orthophosphates at the same ratio of $Na_2O / P_2O_5 = 5/3$ as hereinabove stated. There are obtained hard, spherical granules in a quantitative yield; the fines content is practically negligible or very low. If desired or necessary, the fines are returned to the granulation, along with the crushed oversizes.

Most frequently, there are selected granules having a diameter ranging from 0.1 mm to 3.15 mm according to the selected equipment and adjustment. These granules contain water of hydration, for example, 15% by weight when the granulation solution is of 50%. It is advantageous to dry the granules in a fluidized bed. The density of the orthophosphate granules can be adjusted by successive dampings and dryings. In this manner it is possible to obtain granules whose bulk density lies between 0.5 and 1.3. More particularly, there have been obtained granules whose bulk density changes from 0.65 to 0.9 after three successive passes.

Subsequently, the granules are introduced into a thermal treatment apparatus which is advantageously a fluid bed. The fluidization rate is selected according to the size of the granules, their density and the features of the apparatus. Speeds may be selected ranging from 0.2 meter per second to 2 meters/sec and more. By way of example, a speed from 1 to 2 m/sec. with granules having 2 mm in diameter has been selected, and there has been obtained a good yield.

In the second method of processing by thermal treatment, the granules are introduced into the fluid bed, preceded by pneumatic conveying at high temperatures or "flash"; the total residence time of the granules is still shorter than in the fluid bed of the thermal treatment. By way of example, granules staying for 10 seconds in a "flash" at 550° C exit at about 370° – 380° C, and 30 seconds in a fluid bed at 350° C are sufficient to obtain granules completely converted to tripolyphosphate.

It has been found in the application of the second method of processing according to the invention that the content of form I tripolyphosphate can be predetermined by the selection of a fluid bed temperature between 360° and 480° C.

It is also known that the result of the thermal treatment to some extent depends on the water content present in the gases. It has been found that for the same temperature there is obtained more form I tripolyphosphate with an amount of water vapor below about 14%, or more form II tripolyphosphate with an amount of water vapor above about 14%. In actual practice it is advantageous to maintain the water vapor content constant and to determine the form I content by adjusting the fluid bed temperature to between 360° and 480° C. A water vapor content is advantageously selected to a range between 14 and 100% by weight.

According to an improvement in the second method of processing of this invention, the thermal treatment is achieved by introducing spherical granules of orthophosphates by means of pneumatic conveying at a high temperature in a fluid bed whose gases are at a temperature between 300° and 480° C and contain from 14 to 100% by weight of steam, and there is collected granulated sodium tripolyphosphate having a form I content which increases as the fluid bed temperature increases to 480° C. The granulated sodium tripolyphosphate produced is completely in form I when the temperature of the gases of the fluid bed is at least equal to 480° C, and all of the granulated sodium tripolyphosphate produced is of form II when the temperature of the gases of the fluid bed is equal to or below 360° C.

For example, for a water vapor content of the fluid bed gases of 20%, there is obtained a tripolyphosphate whose form I content is substantially linear with the temperature. Consequently, the form I content of the tripolyphosphate obtained can advantageously be predetermined by the single adjustment of the temperature.

Another advantage of the second method of processing of the invention is that the operating conditions of the "flash" can be selected over an extended range of conditions, particularly the residence times, the temperature and the composition of the gases at the inlet and at the outlet, without affecting the form I content of the product.

More particularly, it has been found that the flash temperature may vary, for instance, between 400° and 600° C, the water vapor content in the gases can be selected at any value, for instance between 20 g/m³ and the pure overheated vapor. Economical conditions are realized by the admission of air containing about 2% by weight of water vapor in the flash.

In the different methods of processing, the granules from the second stage of the process constitute the final product. The conversion of orthophosphate to polyphosphate is practically complete, above 95% and frequently close to 100%.

There is observed substantially no presence of insoluble high polymers.

The repartition in phase I and phase II is determined by means of radiocrystallographic analysis. The hydration rate is measured as follows: There is measured the increase in temperature of an amount of 150 g of tripolyphosphate which is added to 200 g of water at 80° C containing 50 g of sodium sulfate ($Na_2SO_4$) in solution. The temperature is recorded minute by minute. The hydration rate is determined by the rate at which the temperature increases.

There is also observed the eventual setting at the hydration. Unexpectedly, it has been found that the granules of the invention do not set at the hydration, even when they are composed of phase I. In this case they display the double advantage of a fast hydration and the absence of setting. The finished granules are practically dry, they have the shape and the granulation size of the granules of orthophosphates prepared in the first stage of the process. Their bulk density is slightly decreased. The diminution corresponds with the intermolecular dehydration; it is of the order of 8 to 9%.

The granules of orthophosphates are easily produced in conventional granulation apparatus in the wet state with any aqueous solution; they are easily handled in the different apparatus, particularly the sifters and the dryers. Moreover, they undergo the thermal treatment without attrition and without giving rise to the phenomenon of sticking as in the known procedures.

In the thermal treatment adjustment, it has been found to be sometimes beneficial to turn to account certain already known properties of the mineral salts such as sodium sulfate or potassium chloride. In particular, it is known that "low temperature" form tripolyphosphate can be obtained by a temperature adjustment giving normally a mixture of both forms due to the addition of sodium sulfate; or furthermore, for the adjustment, the "high temperature" form, due to the addition of potassium chloride. Thus, there is the possibility to comply with a request in form I or form II without disturbing the temperature adjustment of the apparatus.

In the process of this invention, the mineral salts are introduced in the form of an aqueous solution as a granulation solution. With reference to the known processes, there is the advantage to introduce only a minute amount of foreign salts, the amount introduced generally being of the order of some percent by weight with regard to the alkaline orthophosphates corresponding to the amount required for the running of the granulator.

It is obvious that in spite of their relative hardness, the tripolyphosphate granules of the invention can be crushed by any known procedure and yield a powder which has the same chemical composition as the granules. Of course, the process of this invention can be applied to the manufacture of all polyphosphates of alkali metals whose atomic ratio of alkali metal to phosphorus is between 1 and 2. The process is advantageously carried out continuously.

Having described the basic concepts of the invention, reference is now made to the following examples which illustrate the practice of the invention.

EXAMPLE 1

Into a conventional type granulation plate, there is continuously introduced atomized sodium orthophosphate having the ratio Na/P = 5/3 at the rate of 88 kg per hour. To the moving product in the granulator there is added an aqueous solution containing 50% by weight of orthophosphate, having the ratio Na/P = 5/3, at a rate of 44 kg/hour. From the granulator there are extracted continuously granules whose size grading is defined by screening between 3.15 and 1 mm; the over-sizes previously crushed are recycled into the granulator feed.

There are obtained slightly damp granules having a bulk density of 0.63. At 100° C they have a loss of 18%. The granules are dried in a fluid bed fed with hot gases in order that the fluid bed temperature is kept at 100° C. At the outlet of the drying fluid bed, the practically anhydrous granules are hard and are not subject to attrition at the time of further treatments. They are introduced at the rate of 110 kg/hour into a bed of granules kept in the fluidized state by hot gases containing 10% by weight of water vapor; the effluents are at 350° C; the average residence time is 15 min. There are produced 100 kg of granules per hour which are continuously discharged by an overpouring device.

The sodium tripolyphosphate thus obtained retains the size grading of the initial granules of orthophosphates and it contains no fines; its bulk density is 0.50. The quantitative chromatographic analysis shows that it contains 3% of the anions in the diphosphoric form, the remainder in the triphosphoric form is tripolyphosphate in pure form II as shown by radiocrystallographic analysis. The hydration rate is determined by the temperature increase; the temperature is about 80° C in one minute and about 86° C in 5 minutes.

EXAMPLE 2

All operations are carried out as in Example 1, but the fluid bed temperature of the thermal treatment is raised to 450° C and the water vapor content of the gases is equal to 7% by weight.

There is obtained tripolyphosphate containing 70% of form I and 30% of form II.

EXAMPLE 3

Using the procedure as in Example 2, the fluid bed temperature of the thermal treatment is set at 480° C. There is obtained granulated tripolyphosphate of form I practically pure.

The granules are subjected to hydration and it is found that the granules solubilize without setting.

EXAMPLE 4

Into a granulator there is continuously introduced atomized sodium orthophosphate having the ratio Na/P = 5/3 at the rate of 132 kg/h. An aqueous solution containing 50% by weight of orthophosphates at the ratio Na/P = 5/3 is added to the moving product in the granulator at the rate of 66 kg/h.

From the granulator there are continuous extracted granules whose size grading is defined by screening between 3.15 and 1 mm.

The fine and coarse particles previously crushed are returned to the granulator feed. The granules retained have a bulk density of 0.63 and a loss of 18% at 100° C.

The granules are dried in a fluid bed at 100° C. The granules from the drier are introduced at a rate of 165 kg/h into a pneumatic conveying fed by gases at 600° C. The residence time of a granule in the pneumatic conveying is about 2 seconds. At the outlet of the pneumatic conveying, the granules which are at a temperature of about 380° C enter into the fluid bed and are kept there for 5 min. The fluid bed temperature is 350° C and the water vapor content of the gases is 7% by weight.

Thus, there are obtained per hour 150 kg of sodium tripolyphosphate containing 70% of form I and 30% of form II.

EXAMPLE 5

The following examples show the influence of different foreign salts introduced in the form of a solution used for the granulation on the crystalline form of the tripolyphosphate obtained. All the following tests are operated as in the preceding Example 4.

a. By way of comparison, the atomized orthophosphates are granulated with pure water. The non-dried granules obtained have a loss of the order of 18% at 100° C. They are treated as previously described.

The tripolyphosphate obtained contains about 60% of form I and 40% of form II.

The hydration rate confirms the presence of form I; effectively, the temperature increase is such that 88° C are reached in 1 min. and 89.5° C in 5 minutes.

b. The same starting materials are granulated with water with an admixture of sodium sulfate so that the dry granules contain 3% by weight of $Na_2SO_4$ based on the starting materials. The calcination is achieved as in (a).

The tripolyphosphate obtained is the practically pure form II. The hydration rate is very slow. The temperature increase occurs only 30 min. after the discharge of the product into the water.

c. 5% of tripolyphosphate of the form I or II are incorporated to the granulation. There is obtained tripolyphosphate of the pure form II.

d. An amount of potassium chloride is incorporated in the granulation such that there is from 0.10 to 0.20% by weight of potassium ions based on the starting materials.

There is obtained tripolyphosphate of the pure form I. The granules hydrate without setting.

e. 5% by weight of tripolyphosphate and 1.5% by weight of potassium chloride are introduced to the granulation.

There is obtained tripolyphosphate containing 40% of form I and 60% of form II.

Examples 1, 2 and 3 demonstrate the shortness of the residence time required for the practically complete conversion reaction of the orthophosphates to polyphosphates in a fluid bed. Example 4 shows that the residence time is still further reduced when use is made of pneumatic conveying followed by a fluid bed. Moreover, the fluid bed of Example 4 is at 300° C and yields a product identical to that of Example 2 containing 70% of phase I and 30% of phase II. In Example 2, the fluid bed is at 450° C.

The granulated product of Example 3 does not set at hydration, although it has form I.

EXAMPLE 6

Granules of orthophosphates are prepared as in Example 1, from atomized sodium orthophosphate at the molar ration of Na/P = 5/3.

There are selected granules having a diameter between 3.15 and 1 mm. They are dried and their bulk density is 0.61 g/cm³. The orthophosphate granules are continuously introduced at the inlet of the "flash", along with gases at a temperature of 580° C and containing 20% by weight of water. The residence time of the granules in the flash is 3.5 sec. At the outlet of the flash, the granules are separated from the gases and are introduced into a fluid bed at 480° C in which the gases contain 20% by weight of water vapor. The residence time of the granules in the fluid bed is 10 min.

There are obtained granules practically in the whole composed of sodium tripolyphosphate of form I, having a bulk density of 0.55 g/cm³ and a granulation identical to that of the introduced granulates of orthophosphates.

Although composed of form I and anhydrous, these granules do not set at the time of putting in solution.

In the two examples that follow, the operating conditions of Example 6 were made use of with the exception of the temperature of the gases in the flash.

EXAMPLE 7

The flash gases are at 540° C at the outlet, instead of 420° C. The tripolyphosphate obtained at the outlet of the fluid bed is identical to that of Example 6.

EXAMPLE 8

The flash gases are at 460° C at the inlet instead of 680° C. The tripolyphosphate obtained at the outlet of the fluid bed is identical to that of Example 6.

EXAMPLE 9

The operating conditions are the same as those of Example 1, except the water content of the gases at the inlet of the flash was 2.3% instead of 20%.

The tripolyphosphate obtained is identical to that of Example 6. Its hydration rate is measured under the conditions described above and there is found a temperature of 97.6° C after 1. minute.

EXAMPLES 10, 11, 12, 13 and 14

The operating conditions are identical to those of Example 9 with the exception of the fluid bed temperature. for different temperatures there are obtained tripolyphosphate granules whose composition in form I and form II is determined as previously.

The following table shows the fluid bed temperatures and the characteristics of the granulated tripolyphosphate obtained in each case.

| Example | 9 | 10 | 11 | 12 | 13 | 14 |
|---|---|---|---|---|---|---|
| Temperature | 480 | 470 | 455 | 410 | 370 | 360 |
| % form I | 100 | 90 | 80 | 40 | 10 | 0 |
| % form II | 0 | 10 | 20 | 60 | 90 | 100 |

There is measured the hydration of the granulated tripolyphosphate obtained at the outlet of the fluid bed in Example 9. After 1 min. there is found 79° C, and 82.1° C after 5 min.

EXAMPLE 15

The operating conditions are identical to those of Example 12, except the water content of the fluid bed gases is 5% instead of 20% by weight. The sodium tripolyphosphate obtained contains 60% of form I and 40% of form II.

We claim:

1. A process for the manufacture of sodium tripolyphosphate having a predetermined crystalline form between 100% phase I and 100% phase II and predetermined mixtures of phase I and phase II comprising the steps of
    1. granulating a mixture of sodium orthophosphates having a molar ratio of sodium oxide to phosphoric anhydride between 1 and 2, 2. drying the granules obtained at a temperature below 120° C, and
3. subjecting the resulting dried granules to thermal treatment in the presence of water vapor including the steps of introducing the granules to a fluid bed containing between 14 and 100% water vapor maintained at a temperature within the range of 300° to 480° C, the temperature being such that the orthophosphate granules are completely converted to tripolyphosphates in less than 30 minutes.

2. A process according to claim 1 wherein the alkali metal orthophosphates are sodium orthophosphates and the mixture of mono- and disodium orthophosphates has a molar ratio $Na_2O/P_2O_5$ about 5/3.

3. A process according to claim 2 wherein the granulation is achieved by means of an aqueous solution of a mixture of mono- and disodium orthophosphates having a molar ratio $Na_2O/P_2O_5$ about 5/3.

4. A process according to claim 1 wherein the granules of orthophosphates have a diameter between 0.1 and 3.15 mm.

5. A process according to claim 1 wherein the thermal treatment of the spherical granules of orthophosphates is achieved in a fluid bed.

6. A process according to claim 1 wherein the thermal treatment is achieved by introducing the spherical granules of orthophosphates into a fluid bed by means of pneumatic conveying at high temperature.

7. A process according to claim 6 wherein the thermal treatment is achieved by introducing the spherical granules of orthophosphates by means of a pneumatic conveying at high temperature into a fluid bed whose gases are at a temperature between 360° and 480° C and contain from 14 to 100% by weight of aqueous vapor, and collecting granulated tripolyphosphate having a form I content which increases as the fluid bed temperature approaches 480° C.

8. A process for the manufacture of granulated sodium tripolyphosphate composed in the whole of form I according to claim 7 wherein the temperature of the fluid bed gases is at least 480° C.

9. A process for the manufacture of granulated sodium tripolyphosphate composed in the whole of form II according to claim 7 wherein the temperature of the fluid bed gases is up to 360° C.

10. A process for the manufacture of granulated sodium tripolyphosphate whose form I content is in a practically linear relation with the temperature according to claim 7, wherein the aqueous vapor content of the fluid bed gases is adjusted to 20% and their temperature between 360° and 480° C.

11. A process according to claim 7 wherein the pneumatic conveying is achieved at a temperature ranging from 400° to 600° C.

12. A process for the manufacture of sodium tripolyphosphate having a predetermined crystalline form between 100% phase I and 100% phase II and predetermined mixtures of phase I and phase II comprising the steps of
1. granulating a mixture of sodium orthophosphates having a molar ratio of sodium oxide to phosphoric anhydride between 1 and 2,
2. drying the granules obtained at a temperature less than 120° C to prevent conversion of the orthophosphate granules, and
3. subjecting the resulting dried granules to thermal treatment in the presence of water vapor including the steps of introducing the granules at a temperature of 400° to 600° C into a fluid bed maintained at a temperature between 300° to 480° C and containing 14 to 100% water vapor, with the temperature of fluid bed being sufficient to convert the orthophosphate granules to tripolyphosphate form in less than 30 minutes.

* * * * *